Jan. 10, 1928.
W. T. MORRIS
1,656,011
AUTOMOBILE BUMPER
Filed Sept. 3, 1924
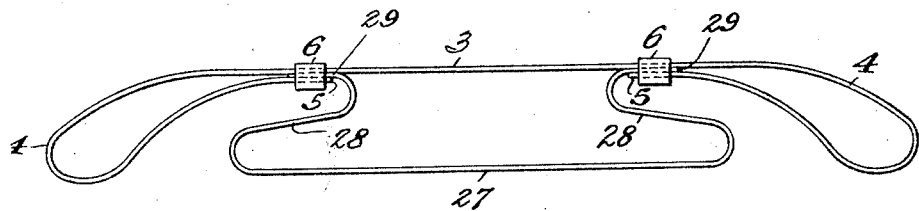
INVENTOR
WILLIAM T. MORRIS
BY
ATTORNEY Patented Jan. 10, 1928.

1,656,011

UNITED STATES PATENT OFFICE.

WILLIAM T. MORRIS, OF BROOKLYN, NEW YORK, ASSIGNOR TO AMERICAN CHAIN COMPANY, INC., A CORPORATION OF NEW YORK.

AUTOMOBILE BUMPER.

Application filed September 3, 1924. Serial No. 735,575.

This invention relates to automobile bumpers, more particularly of the type comprising a main front bar of resilient metal having its ends bent upon themselves and clamped respectively to the main bar near each end to form end loops, and the object of the invention is to provide an auxiliary or supplemental rear bar co-extensive in length with the distance between the aforesaid clamps and having its ends bent around to enter the clamps and be there secured, the body of the rear bar being spaced from the body of the front bar by the last named bent end portions, the curvature of which is such as to augment considerably the resilience factor of the bumper, while the extended character of the body portion of the rear bar has the effect of completing the continuity of the central portion of the bumper structure as a flattened ring of metal.

Such a continuous flat ring constitutes in many respects the best form of basic element for a bumper, on account of its inherent stability, resistance to deformation, and tendency to resume normal contour after impacts, and by including as an element in its composition a front bar which has its ends looped beyond the periphery of the ring, I have devised a structure which combines the advantages of the flat ring with the lateral, springy, tip protection for fenders and wheels which is recognized as a desideratum, and which is difficult to provide in the flat ring type of bumper as constructed conventionally without making the same unwieldy and unsightly.

Referring to the drawings, the figure illustrates in plan view the now preferred form of bumper embodying the invention.

In the illustrated embodiment, the reference numeral 3 designates the middle portion of an impact member or front bar which is provided with bumper tips 4 preferably formed in continuation of the front bumper bar by bending its ends 5 around upon the main portion 3 to form return portions in the loop form desirable for protection of fenders and other lateral parts of an automobile structure.

The ends 5 are secured to the main portion by clamps 6, and in accordance with the invention I provide a supplemental rear bar 27, spaced from the front bar 3 by reverse bends 28 formed near each end 29 of the rear bar, which is preferably co-extensive in length with the main portion 3 of the front bar, the ends 29 being inserted between the front portion 3 of the impact member and the ends 5 of the loops, and secured in the clamps 6, so that the rear bar and front bar form in combination a closed flat ring, constituting the basic part of the bumper, which may be supported by suitable devices connecting the rear bar 27 with the frame of an automobile.

This arrangement of the ends 29 tends to equalize the frictional resistance to endwise displacement of the contacting parts, and the reverse bends 28 constitute a form of support which is yielding, but gradually absorbs the total force of an impact against the bumper from whatever direction it may be received.

Having thus described my invention, I claim:—

An automobile bumper comprising an elongated flat ring formed by a front bar and a supplemental rear bar spaced apart and united by clamps within which are embraced the end portions of said bars respectively, said clamps embracing also portions of said front bar intermediate its ends, the latter being formed into loops extending laterally beyond the periphery of said flat ring and said rear bar having its end portions curved forward from the plane of its body to the region of said clamps respectively, to serve as spacing means, said curved portions comprising reverse bends symmetrically disposed rearward of the clamping regions, the ends of the rear bar being embraced between the front bar and its return end portions, to equalize the frictional resistance thereof to endwise displacement.

In testimony whereof, I have signed this specification.

WILLIAM T. MORRIS.